US005636870A

United States Patent [19]

Enhorning

[11] Patent Number: 5,636,870

[45] Date of Patent: Jun. 10, 1997

[54] PREGNANCY DATA RECORDING SYSTEM

[75] Inventor: Goran Enhorning, Buffalo, N.Y.

[73] Assignee: The Research Foundation of State University of New York, Amherst, N.Y.

[21] Appl. No.: 329,956

[22] Filed: Oct. 25, 1994

Related U.S. Application Data

[62] Division of Ser. No. 73,855, Jun. 8, 1993, abandoned.

[51] Int. Cl.$^6$ .............................. G01B 3/10; G01B 3/02

[52] U.S. Cl. .............................. 283/2; 283/67; 283/115; 434/430

[58] Field of Search .............................. 235/70 R, 70 A, 235/78 RC, 88 RC; 283/115, 67, 2–4; 434/262, 430, 416; 128/778, 738, 774; 33/512, 311

[56] References Cited

U.S. PATENT DOCUMENTS

| | | | |
|---|---|---|---|
| 721,405 | 2/1903 | Wheildon | 283/115 |
| 726,086 | 4/1903 | McAlpine | 33/574 |
| 766,677 | 8/1904 | Eagle | 33/574 |
| 1,694,490 | 12/1928 | Salzmann | 33/579 X |
| 2,220,923 | 11/1940 | Trilling | 33/579 X |
| 3,703,142 | 11/1972 | Mimlitch | 33/579 X |
| 4,057,140 | 11/1977 | Hutzel | 206/216 |
| 5,496,070 | 3/1996 | Thompson | 283/2 |

FOREIGN PATENT DOCUMENTS

| | | | |
|---|---|---|---|
| 3501885 | 2/1986 | Germany | 402/79 |

OTHER PUBLICATIONS

Gardosi et al, 'Customized Antenatal Growth Charts', "The Lancet", vol. 339, pp. 283–287 Feb. 1,1992.

Eisenberg et al, "What to Expect the First Year", pp. 650–651 1989.

Hakansson, Anders et al, "A new sysmphysis–fundus height growth chart based on a well defined female population with ultrasound–dated singleton pregnancies", Acta Obstetricia et Gynecologicia Scandinavica, vol. 74, No. 94, pp. 682–686 Oct. 1995.

Seiler, E. R. et al. "Obstetrical Chart", J. Roy. Coll. Gen. Practit., vol. 20, No. 96, pp. 59–60 Jul. 1970.

*Primary Examiner*—Frances Han

*Attorney, Agent, or Firm*—Heslin & Rothenberg, P.C.

[57] ABSTRACT

This invention provides a system for management of data collected over the course of a pregnancy which allows the physician to make better use of patient data in the ascertainment and treatment of potentially pathological conditions and which facilitates transfer of patient data to computer memory. The system includes a chart upon which a data point are indicated by placement of a mark relative to a vertical measurement axis and a horizontal gestational week time axis. Data expressed on the chart provide a retrospective graphical representation of developmental progress through the date of the most recent entry. Data from the chart may be transferred into computer memory with a laser scanner. A marking implement to facilitate scanning is also included.

11 Claims, 5 Drawing Sheets

PREGNANCY DATA RECORDING SYSTEM

This application is a division of application Ser. No. 08/073,855, filed 8 Jun. 1993, now abandoned.

COPYRIGHT

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention provides a system for management of data collected over the course of a pregnancy which allows the physician to make better use of patient data in the ascertainment and treatment of potentially pathological conditions and which facilitates transfer of patient data to computer memory.

BACKGROUND OF THE INVENTION

Medical science has demonstrated that early and continual monitoring of fetal development and maternal health is essential to detecting complications in pregnancy and lowering infant mortality and morbidity. Historically, physicians have maintained handwritten records of the progress of mother and fetus for diagnosis of potential complications. However, this method of supervision may not facilitate an early detection of pathological states, since the handwritten format makes retrospective envisionment of developmental progress difficult, especially when visits occur at non-uniform time intervals. In addition, changes in some parameters may be of negligible importance at a certain gestational age, but of utmost significance at another, and therefore may be overlooked for lack of a conspicuous correlation between the change itself and the gestational week of its occurrence. As a result, developing pathological conditions indicated by handwritten records may be overlooked until more obvious symptoms appear.

A further short-coming of handwritten records is the large amount of work required to reduce handwritten data to a computer accessible form. Computer accessible pregnancy data presents the capability to ascertain, for example, the relative success of prenatal care among different physicians, hospitals or geographic areas, the effects of localized environmental factors on perinatal development and mortality, or the success of specific treatments administered during pregnancy. However, to date no system has been developed which facilitates computerization of records while matching the expediency of recording data by hand, and so exploration of such statistical inquiries has been impeded.

Dr. Bjorn Westin has explored graphical expression of data such as maternal weight gain, symphysis-fundal height, and maternal blood pressure as a method of pregnancy supervision. This method has had a significantly beneficial effect on obstetrical care and teaching in Sweden, where it has been shown to result in a reduction in antepartum, intrapartum, and neonatal mortality, as well as a general improvement in the overall condition of newborns. However, Dr. Westin's charts are based on data which is originally recorded in a handwritten format, necessitating time-consuming reprocessing to produce the actual graphs. As a result, potential indications of pathological states are apparent only in retrospect and are not conspicuously available to the patient's physician when they first appear. Furthermore, the various data parameters are presented on separate axes, thereby occupying significant space as well as impeding the recognition of symptoms which are best indicated by simultaneous observation of the collective progress of development of several parameters.

Consequently, there exists a need for a pregnancy data management system which makes efficient use of observed pregnancy data, which utilizes an expedient means for data recording, and which facilitates computer acquisition of data.

SUMMARY OF THE INVENTION

The present invention provides a system for collection and management of pregnancy data. The system includes a compact chart occupying a single page for quick and precise recording in a graphical format of a plurality of measurements taken at a succession of visits to a physician during pregnancy, and a means for correlating the calendar date of a visit to its corresponding gestational week. The system may further include a marking implement to facilitate precise placement of a mark indicative of a data point on the chart, and a laser scanner for transferring data from the chart to computer memory.

The chart occupies a single standard sized eight and one-half inch by eleven inch sheet of paper. Spanning the distance between the left and right margins at the approximate vertical center of the page is a gestational week time axis calibrated in weeks. The time axis provides a common coordinating axis for several charts disposed above and below it, upon which data points representing observed quantities will be noted at successive visits to the physician over the course of the pregnancy. Directly adjacent and parallel to the time axis lies a space which is designated for a date strip. The date strip is a long narrow strip of paper or some other flexible substrate, along the length of which is printed a second time axis marked sequentially with calendar dates rather than gestational weeks. Increments on the date strip are calibrated to be equal to those on the first time axis, such that the distance along either axis indicating a span of one week is the same. In operation, the corrected date of the last period is determined for the patient, and this calendar date is located on the date strip. The date strip is then affixed adjacent and parallel to the gestational week time axis, with the corrected date of last period being located at the far left edge of the paper. In this orientation, the date strip provides a calendar date to correspond to any point along the gestational week time axis.

In the area of the chart located above the gestational week time axis and date strip are three defined areas for recordation of data. A weight gain envelope, located directly above the date strip, spans the chart from the fifth to the forty-second week of gestation, and is designed to encompass a range within which weight gain values over the course of pregnancy will fall for nearly all patients. Above the weight gain envelope lies a symphysis-fundal height envelope, which is also designed to encompass a range within which symphysis-fundal height values over the course of pregnancy will fall for nearly all patients. At the upper left corner of the chart is an empty space intended for the patient's name plate. Surrounding that space is a medical history area, wherein space is provided for indicating by a mark several factors which together constitute a concise medical history of the patient.

Below the gestational week time axis lie several defined areas arranged vertically upon one another. These areas include a blood pressure measurement area, for systolic and diastolic blood pressure data, as well as areas for indicating the degree of presence of glucosuria and albuminuria. Further space is reserved for indicating data to be recorded at the time of delivery. The back of the chart is provided with a lined surface similar to standard lined paper, and can be used for making detailed records of other factors not facilitated by the front surface of the chart.

In practice, a chart is configured for a patient by stamping a name plate in the upper left corner and affixing a date strip such that the corrected date of the last period is located at the far left edge of the paper. Medical history data can then be recorded by placement of marks in the appropriate locations in the upper left corner. In addition, the first measurements of data quantities to be monitored over the course of the pregnancy are recorded. Recording is accomplished by first drawing a vertical date line, of approximately the vertical length of the paper, through the calendar date of the visit as indicated by the date strip. Such lines may be produced using a ruler or an architect's miniature drawing board. The date line provides a reference to both the calendar date and gestational week of the visit, and indicates the points at which all measurements made at that visit should be recorded. Measurements are then made, and are recorded by making a mark along the date line at the proper location within each designated area. In addition to these marks, notations may be made as to absolute weight at the time of the visit, as well as to drugs prescribed at the time of the visit. These may be recorded in blank areas provided above and below the time axis, respectively.

Upon repeating this procedure for several successive visits, the data recorded on the chart will provide a retrospective graphical representation of development of each particular parameter to date. In this way trends which may indicate pathological states may be recognized and responded to earlier than if the physician was limited to analysis of handwritten data. For example, unusual weight gain may indicate twins or pre-eclampsia. This mode of data recordation and analysis is especially useful when visits occur at non-uniform intervals, as the date strip and gestational week time axis provide proper temporal distribution of data points. Use of the chart is continued through delivery, at which point the remainder of the date strip beyond the date of delivery is whited out using a white label or other means.

Any means may be employed to create a mark indicative of a data point on the chart. However, for the most accurate record keeping, as well as to facilitate computer acquisition of data, the marks used should be distinct, uniform, relatively small, and preferably in the shape of a scanable character. To facilitate the marking process, a marking apparatus is provided which allows for precise placement of a small mark at a desired point. The device is essentially a stamping apparatus which is disposed at the end of a housing. The apparatus bears a marking surface which will imprint a small ring on the surface to which it is applied. To facilitate precise placement of the mark, a stylus is slidably disposed within the housing. The stylus is concentric with the mark, and is biased to extend through the marking surface from within the housing. In operation, the tip of the stylus is placed at a point on the chart at which a mark is desired and the housing is pressed downward, such that the stylus is retrieved within the housing and the marking surface is placed in contact with the chart.

While the chart and marking device disclosed herein are useful in themselves for supervision of a patient during pregnancy, their use also facilitates computerization of pregnancy data. This is accomplished through computer analysis of a digitized image of a completed chart, as would be produced by a color laser scanner such as a HEWLETT PACKARD SCANJET IIC laser scanner. Through such a means the dates and values of all recorded data may be extracted from the chart and stored in computer memory for subsequent use.

Consequently, it is an object of this invention to provide a pregnancy data management system for recordal of traditional observational data at successive visits to a physician's office which provides a conspicuous retrospective summary of maternal and fetal development through the date of the most recent visit.

It is a further object of the invention to provide said summary in a graphical format which provides standardized temporal distribution of data points and visual reference between data points and the calendar date and gestational week of their observation.

It is a further object of the invention to provide said graphical representation without the need for reprocessing of handwritten data.

It is a further object to provide a pregnancy data management system which facilitates computerization of data recorded therein.

It is a further object of this invention to provide a marking implement for precise placement of a clear and defined mark on a surface.

DETAILED DESCRIPTION OF THE PREFERRED EMBODIMENT

Figure 1:
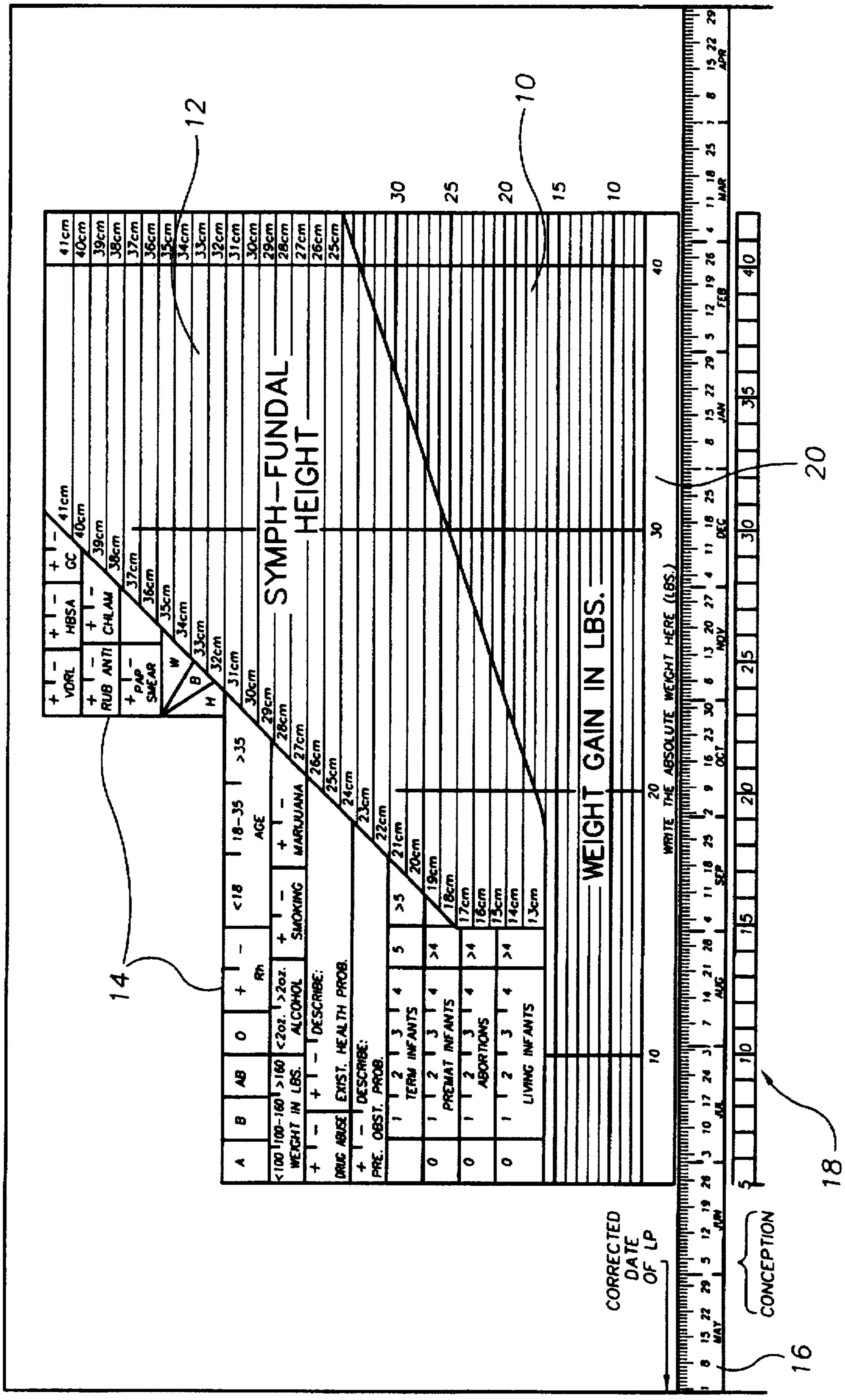
FIG. 1 is a replication of the upper half of the data chart having a date strip affixed adjacent to the gestational week time axis.

Referring to FIG. 1, a gestational week time axis 18 spans the distance between the margins at the approximate vertical center of the chart. The beginning of the axis at the left-hand margin of the paper corresponds to the end of the fifth gestational week. At the right-hand margin the axis terminates at a point which represents the end of the forty-second week of gestation. Between the two margins the time axis is calibrated with marks representing one-week intervals, with the end of every fifth week being indicated by its corresponding numeral. Above and parallel to the gestational week time axis 18 lies a date strip 16, which is affixed to the chart by an adhesive strip (not shown) disposed upon the chart beneath it. Prior to adhesion of the date strip to the chart, the adhesive strip may be protected by a backing so as to retain its adhesive properties. The calibration of the date strip 16 is equivalent to that of the gestational week time axis 18, with the numerical date of every Wednesday being indicated. The date strip is affixed to the chart with the corrected date of the last period being placed at the left edge of the paper. The chart as shown in FIG. 1 has been calibrated for a patient with a corrected date of the last period of May 22. Preferably, the date strip should be long enough to encompass the year during which it will be used, plus the last nine months of the preceding year and the first nine months of the following year. Portions of the date strip extending beyond the edges of the chart may be trimmed and discarded. The date strip 16 and gestational week time axis 18 provide a common axis for the information recorded above and below.

As further shown in FIG. 1, the upper half of the chart is comprised of a weight gain envelope 10 and a symphysis-fundal height envelope 12. At its left side, beginning at the end of the fifth gestational week, the weight gain envelope 10 has a range of from seven to sixteen pounds of weight gain. However, beginning at the nineteenth gestational week, the range increases linearly along a diagonal, such that at the forty-second gestational week the envelope has a range of from seven to thirty-five pounds of weight gain. An absolute weight area 20 is provided between the lower edge of the weight gain envelope and the date strip for noting the absolute weight measured at a particular visit. The symphysis-fundal height envelope 12 begins laterally at the fifteenth week of gestation and extends to the forty-second week, with its lower boundary being defined by the upper boundary of the weight gain envelope. At the fifteenth week the symphysis-fundal height envelope has a range of thirteen to eighteen centimeters, which rises along a diagonal line from that point to a maximum of forty-one centimeters beginning at the thirty-first week and extending to the end of the forty-second week. The orientations of the weight gain envelope and the symphysis-fundal height envelope serve to allow full presentation of each parameter within the confines of the upper half of the chart.

In the upper-left-hand corner of the chart, a medical history area 14 is provided, wherein the placement of a mark within a defined area indicates the presence of the characteristic indicated at that position. Quantities to be indicated include presence of antibodies against syphilis, hepatitis, and rubella, of sexually transmitted diseases, and of dyskaryotic cervical cells. In addition, blood type, Rh factor, age range, weight range prior to conception, habitual use of alcohol, tobacco, or marijuana, drug abuse, and obstetrical history may be recorded.

Figure 2:
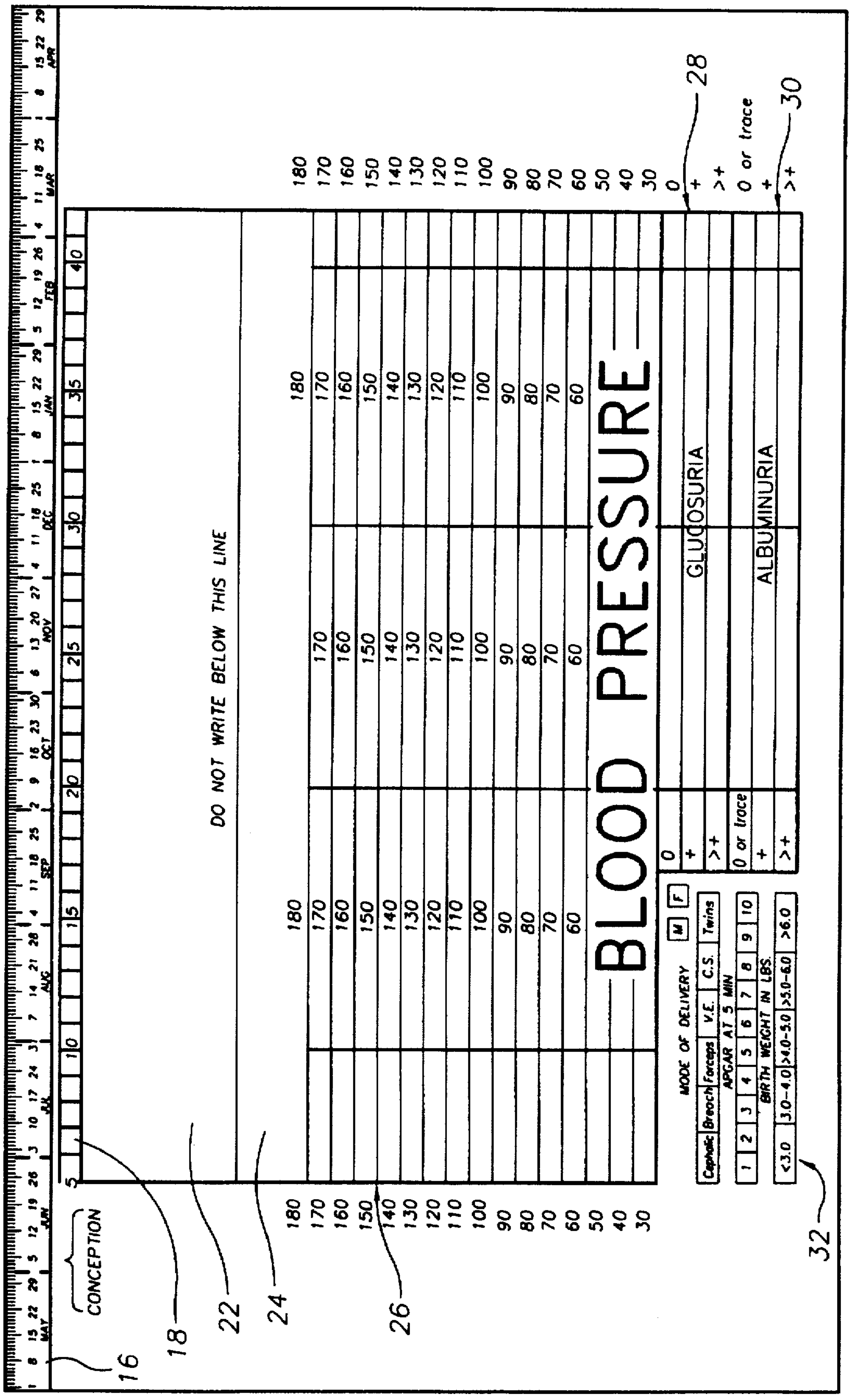
FIG. 2 is a replication of the lower half of the data chart, again including the gestational week time axis and having a date strip affixed adjacent thereto.

The bottom half of the chart, as illustrated in FIG. 2, is occupied by several defined areas, including a notation area 22 for noting significant occurrences tied to specific dates such as the date of Rhogam administration. A blank area 24 lies below the notation area 22. The blood pressure area 26 spans the width of the chart, with a vertical range of thirty to one-hundred and eighty millimeters of mercury, and receives notations for systolic and diastolic pressure at each visit. Below the blood pressure area 26 lie a glucosuria area 28 and an albuminuria area 30, for indication of the presence of those two substance in the urine. To the left of those areas is the delivery data area 32, wherein data acquired at delivery may be entered. Quantities to be recorded include gender, mode of delivery, Apgar score at five minutes subsequent to birth, and birth weight in pounds.

Figure 3:
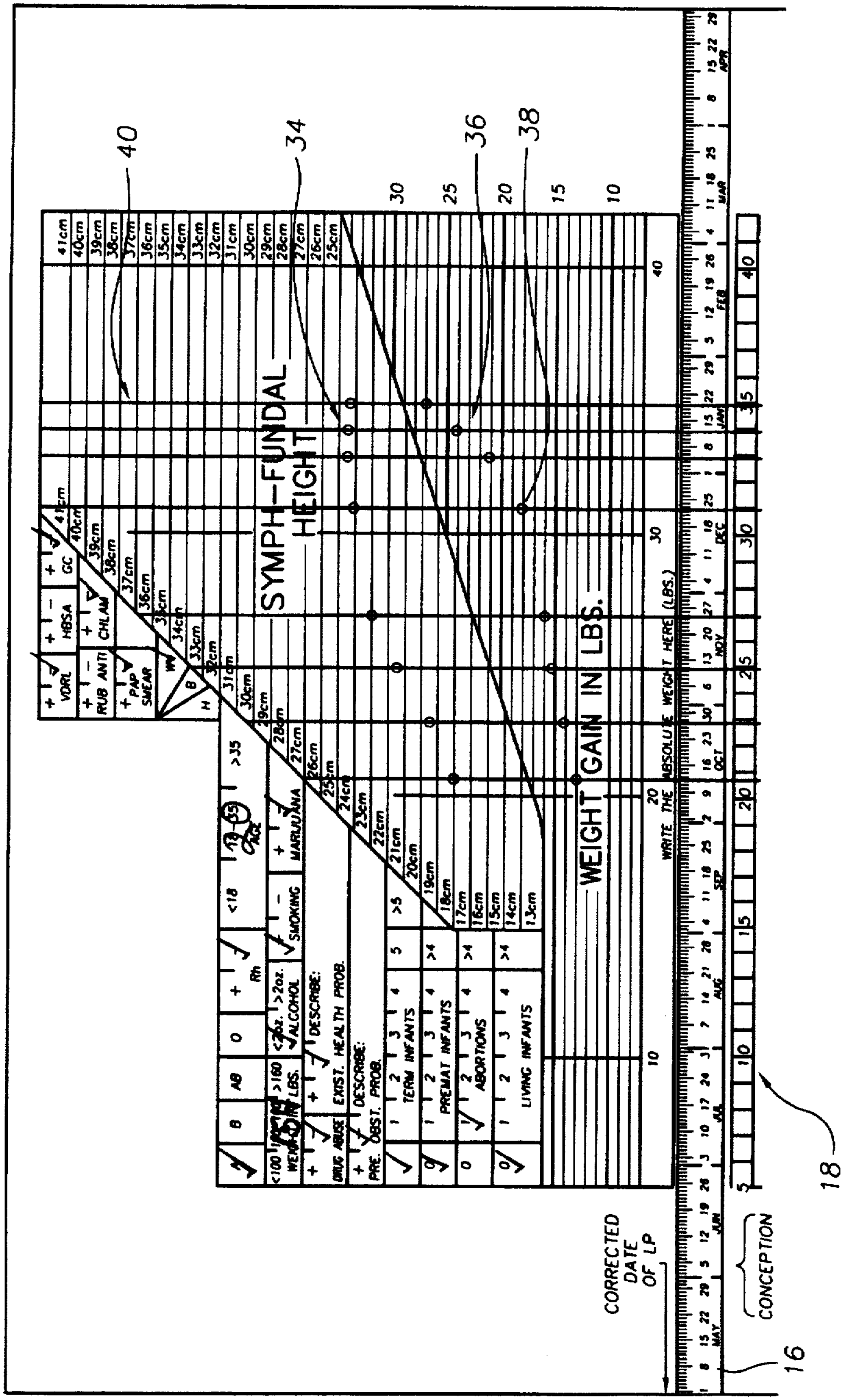
FIG. 3 shows the upper half of the data chart, as illustrated in FIG. 1, with sample data points indicated on the chart to illustrate the graphical representation of said points provided by said chart.

FIG. 3 illustrates the upper half of the chart, as in FIG. 1, wherein sample data from a hypothetical patient has been entered to illustrate the graphical nature of the chart. A plurality of data entries 38 are oriented along a plurality vertical date lines 40 which have been drawn on the chart such that the calendar date and gestational week of the entries are easily ascertained. From the data as entered a symphysis-fundal height curve 34 and a weight gain curve 36 are seen to emerge. In the case of this particular hypothetical patient it can be seen that symphysis-fundal height development has curtailed while weight gain has continued, a scenario which should indicate to a physician the presence of a pathological condition.

Figure 4:
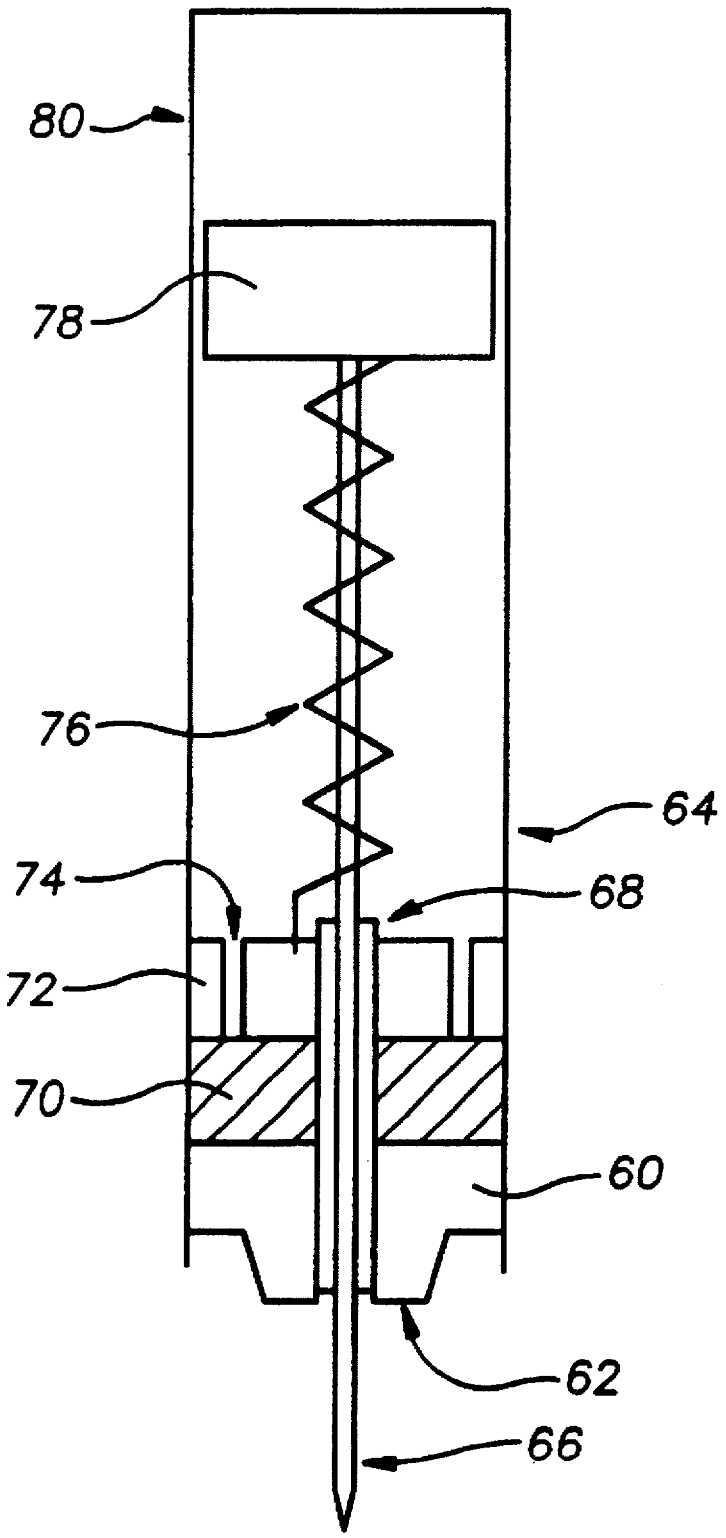
FIG. 4 is a cross-section of a marking implement for precise placement of a mark on a surface.

While any marking implement may be sufficient to indicate data points on the aforementioned chart, FIG. 4 illustrates a marking implement which is particularly directed toward computer acquisition of the recorded data. A stamp head 60, having a marking surface 62, is disposed at the end of a cylindrical housing 64. A stylus 66 is slidably disposed within a longitudinal bore 68 such that it emerges from and is concentric with said marking surface 62. The stylus is urged into an extended position from within the housing by a coil spring 76 which is disposed between the disc and a circular stylus end piece 78. The end piece has the additional effect of maintaining the stylus in a position which is generally coaxial with the housing. Biasing of the stylus may be equally achieved by the use of a compression spring disposed between the said end piece and the distal end 80 of the housing.

The stamp head 60 and marking surface 62 are preferably formed of a "self-inking" matrix. To minimize the area of the mark and maximize precision of placement, as well as to facilitate computer acquisition of data, a ring has been chosen as the mark to be imprinted by the marking surface. However, a limitless variety of other marks, including scanable characters, could be equally disposed on said stamp head.

Figure 5:
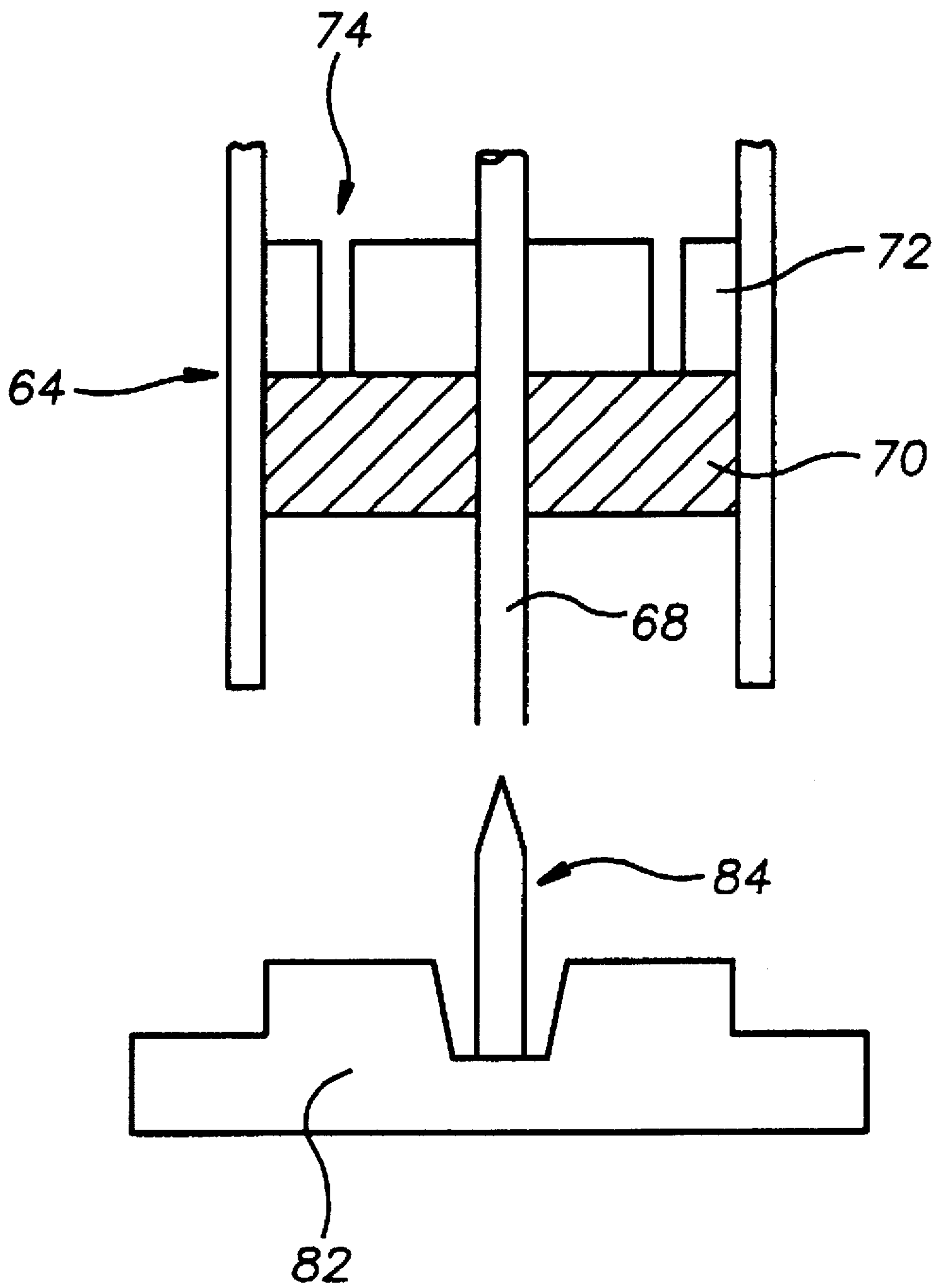
FIG. 5 illustrates a mold useful for forming the marking implement of FIG. 4, wherein the marking surface comprises a moldable matrix of the "self-inking" variety.

Located within the housing and adjacent to the stamp head is a felt pad 70 or other similar absorptive material which retains ink for the marking surface. Adjacent to the felt pad 70 and sealed against the inner surface of the housing is a disc 72 having two transverse bores 74. To manufacture this marking implement, an injection process using a mold as illustrated in FIG. 5 may be employed. During manufacturing, the two bores 74 allow for injection of ink into and escape of air out from a mold formed by the housing 64 and a base 82. The housing 64 of the marking implement fits snugly over the base, with a point 84 disposed within the longitudinal bore 68 to prevent the seepage of ink jelly thereunto. The shape of the mold is such that ink jelly which is injected therein and subsequently hardened will assume and retain the shape of the desired marking surface.

Computer acquisition of data recorded on the chart is accomplished by computer analysis of a digitized image of a completed chart, as would be provided by a HEWLETT PACKARD SCANJET IIC laser scanner. Computer means are used to recognize data points located within that image based on the shape chosen for the mark, and to determine the value of each point from its position relative to the axis provided for each recording area. In a preferred embodiment, particular colors have been selected for various functional aspects of the chart which serve to differentiate among them in locating and valuing each data point. Referring again to FIG. 3, circular data points 38 are stamped in black ink along a vertical date line 40 drawn with a red pen. The grid system of each recording area is printed in blue. Notations to be ignored by the scanner, such as "SYMPH-FUNDAL HEIGHT," are colored green. In operation, black markings matching the shape of the chosen data point character which are located along a red line are recognized as data points, and are valued by ascertainment of their vertical positions within their respective areas. A corresponding date for data points located along said red line may be determined by the position of the line relative to the margins of the chart. In this way the data points and their dates as presented on a particular chart may be acquired and stored in computer memory in any format useful for further statistical inquiry. The many possible ways of implementing this method of computer acquisition of data from the chart as heretofore described will be obvious to one skilled in the art.

While this apparatus and various methods of its use have been shown completely in terms of particular embodiments and applications, one of ordinary skill in the art may generate additional embodiments and applications which do not depart from the spirit or exceed the scope of the claimed invention, and it should therefore be understood that within the scope of the claims the invention may be practiced otherwise than as specifically described.

What is claimed is:

1. An apparatus for directly recording in a graphical format measurements of developmental parameters of a pregnancy, comprising:

a paper chart having thereon a gestational time axis and a plurality of defined non-overlapping parameter areas for directly receiving marks representing measurements of respective developmental parameters, each defined parameter area sharing said gestational time axis as a common axis;

a date strip imprinted on a medium separate from said chart, said date strip having sequential markings thereupon representing calendar dates, said date strip sharing equal units of calibration with said gestational time axis; and means for affixing said date strip to said chart parallel to said gestational time axis such that said date strip provides a common time axis for said defined areas.

2. The apparatus of claim 1, wherein said means for affixing said date strip is an adhesive strip disposed along the surface of said chart adjacent said gestational time axis, and wherein said defined non-overlapping parameter areas are spaced apart along an axis orthogonal to said gestational time axis.

3. A pregnancy data recording system, comprising:

a chart, said chart comprising a gestational time axis and a plurality of defined parameter areas for receiving marks representing measurements of respective parameters of a pregnancy, each defined area sharing said gestational time axis as a common axis and being spaced apart along an axis orthogonal to said gestational time axis;

a date strip having sequential markings thereupon representing calendar dates, said date strip sharing equal units of calibration with said gestational time axis, said date strip being imprinted on a medium which is separate from said chart and which is affixable to said chart parallel to said gestational time axis to provide a common axis for said defined areas; and means for directly recording in a graphical format a mark representing a measurement upon said chart.

4. The system of claim 3, further comprising:

scanning means for generating a digitized image of said chart;

computer means for locating data points within said image and determining the date and value of said data points; and, storage means, for storing said data points.

5. The system of claim 4, wherein said means for directly recording comprises a stamping apparatus, and said chart comprises a sheet of paper.

6. The apparatus of claim 5, wherein said stamping apparatus imprints a scanable character.

7. The apparatus of claim 5, wherein said stamping apparatus comprises a housing bearing at one end a marking surface, and further comprising a stylus, said stylus being concentric with said marking surface and slidably disposed within said housing, for precise placement of a mark made by said marking surface in a desired location.

8. A method of directly recording in a graphical format measurements of parameters of a pregnancy, comprising:

providing a paper chart, said chart comprising a gestational time axis and a plurality of predefined non-overlapping parameter areas for receiving measurement marks representing measurements of respective parameters of said pregnancy, each pre-defined area sharing said gestational time axis as a common axis;

affixing to said chart, parallel to said gestational time axis, a date strip imprinted on a medium separate from said chart, said date strip having sequential markings thereupon representing calendar dates, said date strip sharing equal units of calibration with said gestational time axis, said date strip providing a common axis for said pre-defined areas, said date strip being affixed such that a calendar date of a measurement may be correlated with the location along said gestational time axis of said measurement; and directly recording in a graphical format on said chart a measurement in at least one of said pre-defined areas in a location corresponding to a calendar date and gestational date of the measurement.

9. The method of claim 8, wherein said measurement is recorded as a mark comprising a scannable character.

10. The method of claim 9, comprising the further steps of:

providing a scanning means, a computer means, and a storage means; and, acquiring data recorded on said chart via said scanning means and computing means and storing said data in said storage means.

11. The method of claim 8, wherein said pre-defined non-overlapping parameter areas are spaced apart along an axis orthogonal to said gestational time axis, and wherein said affixing step comprises affixing said date strip such that a corrected date of last period of a patient on the strip is located at an edge of the chart.

* * * * *

UNITED STATES PATENT AND TRADEMARK OFFICE

CERTIFICATE OF CORRECTION

PATENT NO. : 5,636,870

DATED : June 10, 1997

INVENTOR(S) : Goran Enhorning

It is certified that error appears in the above-indentified patent and that said Letters Patent is hereby corrected as shown below:

Column 8:

In Claim 6, line 1, "apparatus" should read --system--.

In Claim 7, line 1, "apparatus" should read --system--.

Signed and Sealed this

Ninth Day of September, 1997

*Attest:*

BRUCE LEHMAN

*Attesting Officer*

*Commissioner of Patents and Trademarks*